March 15, 1960 B. P. BLASINGAME 2,928,668
ACCELEROMETER
Filed June 5, 1959 2 Sheets-Sheet 1
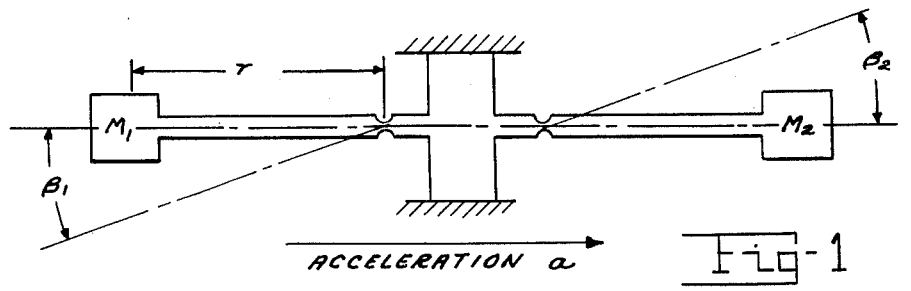
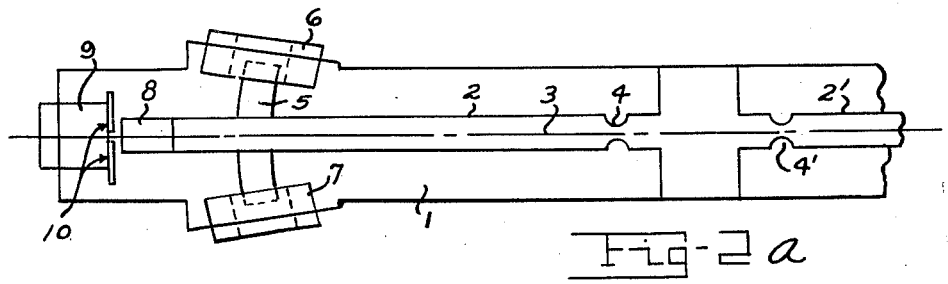
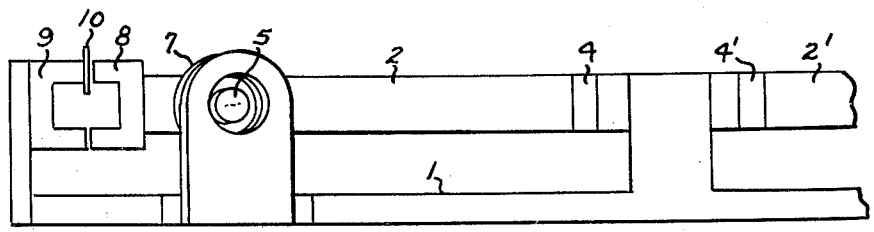
INVENTOR.
B. P. BLASINGAME

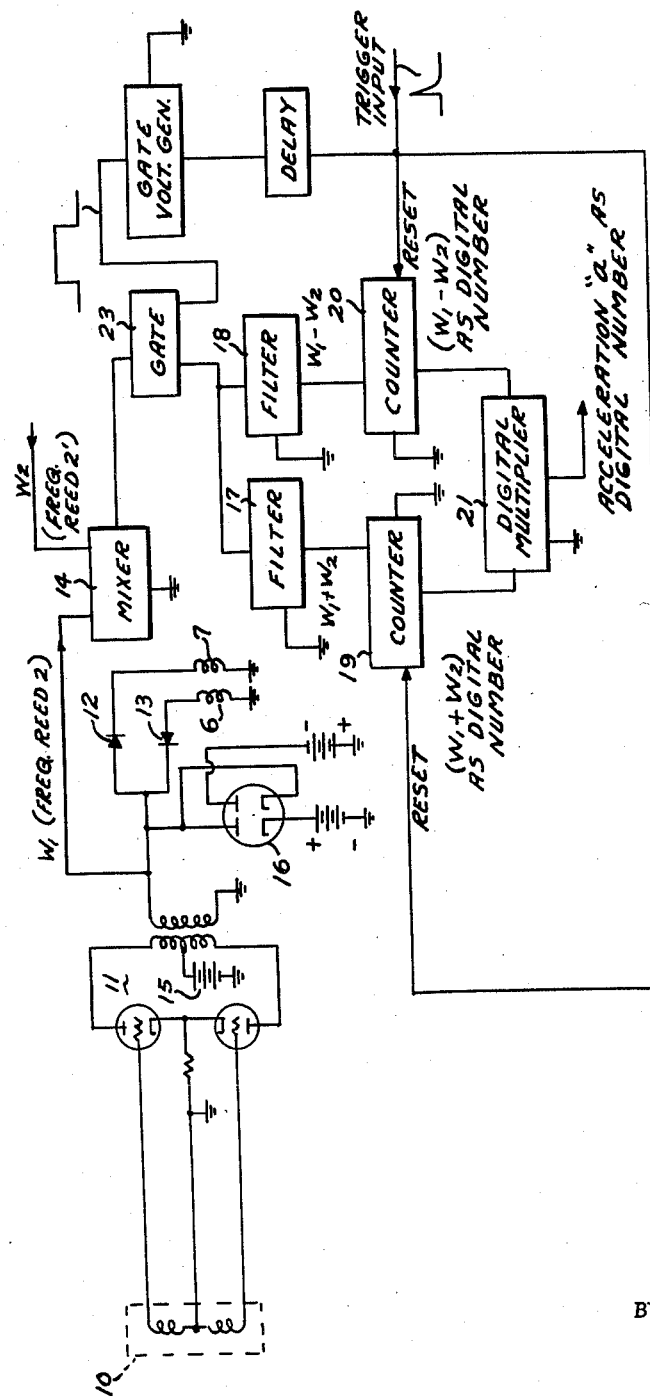

United States Patent Office 2,928,668
Patented Mar. 15, 1960

2,928,668

ACCELEROMETER

Benjamin Paul Blasingame, State College, Pa.

Application June 5, 1959, Serial No. 818,493

1 Claim. (Cl. 264—1)

(Granted under Title 35, U.S. Code (1952), sec. 266)

The invention described herein may be manufactured and used by or for the United States Government for governmental purposes without payment to me of any royalty thereon.

In certain devices for the guidance and control of missiles and aircraft it is necessary to continuously measure acceleration to extreme precision. The measure of acceleration is integrated with respect to time, once to obtain a measure of the vehicles' velocity and twice to obtain a measure of the vehicles' displacement. Further, with the current development of airborne and missile borne digital computers, it is advantageous to have the instrument which measures acceleration have a natural output in digital form. If the output is in terms of the frequency of a voltage, or some simple mathematical treatment of the frequency of a voltage, the digital form may be readily obtained by operating on this voltage to produce a series of pulses which in turn may be counted over known periods of time to provide a digital measure of the frequency.

The invention described herein is an accelerometer which produces as output two alternating voltages whose frequencies are simply related to the acceleration of the instrument.

In simplest form, the invention is a vibrating reed which is caused to vibrate at its natural frequency. The natural frequency of such a device is a simple function of the inertia of the reed, its spring constant, and the acceleration of the reed along the longitudinal axis of the reed. The reed is caused to vibrate at its natural frequency by means of an electrical pick-up which is arranged to measure the velocity of the reed and feed its output to an amplifier which supplies currents to solenoids arranged to apply side forces to the reed proportional to the reed's velocity. This is an arrangement identical to that presently used to cause tuning forks to oscillate continuously.

By arranging two identical such reeds "back to back" so that the natural frequency of one is increased while that of the other is decreased, the two outputs may be combined in a very simple way which removes the "unaccelerated" natural frequency of the system. This provision automatically eliminates drift due to temperature effects, presuming both reeds are at the same temperature and have the same temperature coefficients.

A more detailed description of the invention will be given with reference to the accompanying drawings in which Fig. 1 is a diagram illustrating the basic principle of the invention, Figs. 2a and 2b are plan and elevation views of the accelerometer, and Fig. 3 illustrates the electrical circuits associated with the accelerometer.

To establish the mathematical equations describing the performance of the instrument, reference is made to Fig. 1 which shows a pair of reeds schematically. Consider first the left hand reed and picture the reed instantaneously displaced by the angle $\beta_1$. The forces acting upon the inertia of the reed, which is $M_1 r^2$, are the spring torque proportional to the displacement angle which is $K\beta_1$, the torque due to the acceleration which is $$M_1 ar \sin \beta_1$$

some small damping force due to hysteresis of the material or surrounding gas motion which is $C\dot{\beta}_1$, and of course, the inertia reaction force which is $M_1 r^2 \ddot{\beta}_1$. By d'Almbert's principle, all torques acting on the reed must total zero, thus:

(1) $\qquad M_1 r^2 \ddot{\beta}_1 + c\dot{\beta}_1 + K\beta_1 + M_1 ar \sin \beta_1 = 0$ or, since $\sin \beta_1 = \beta_1$ for small angles, (2) $\qquad M_1 r^2 \ddot{\beta}_1 + c\dot{\beta}_1 + (K + M_1 ar)\beta_1 = 0$ This is the equation of an oscillating system whose natural frequency $W_1$ is given by the following relationship:

(3) $$W_1{}^2 = \frac{K_1 + M_1 ar}{M_1 r^2}$$

Defining $W_n$ as the "unaccelerated" natural frequency:

(4) $$W_1{}^2 = W_n{}^2 + \frac{a}{r}$$

so that (5) $$\frac{a}{r} = W_1{}^2 - W_{n_1}^2$$

or (6) $\qquad a = r(W_1{}^2 - W_{n_1}^2)$

In a similar way it may be seen that the acceleration acts in the opposite direction on the right hand reed causing its natural frequency $W_2$ to be given by the following:

(7) $$W_2{}^2 = W_{n_2}^2 - \frac{a}{r}$$

Assuming the two reeds to be essentially identical, we may, after obtaining the two quantities $W_1{}^2$ and $W_2{}^2$, subtract one from the other to obtain the relation:

(8) $$W_1{}^2 - W_2{}^2 = 2\frac{a}{r}$$

which may be rewritten as (9) $\qquad a = \frac{r}{2}(W_1 - W_2)(W_1 + W_2)$

For the double reed device shown, this may be considered to be the equation describing its performance. The difference and sum of the frequencies of the two voltages may first be obtained by some means such as heterodyning. Then by counting the frequency of the two resulting voltages and multiplying these two counts digitally, the acceleration is obtained as a digital number.

The design characteristics to maximize the sensitivity of the device are apparent from differentiation of Equation 4.

(10) $$2W_1 \frac{dW_1}{da} = 0 + \frac{1}{r}$$

(11) $$\frac{dW_1}{da} = \frac{1}{2rW_1}$$

When the acceleration is very small, $W_1 \approx W_n$ so that

(12) $$\frac{dW_1}{da} \approx \frac{1}{2rW_n}$$

Therefore, for maximum sensitivity, a small $W_n$ must be realized with a short radius. Thus a short and stubby reed will have best sensitivity having a relatively large inertia.

It may be noted that the device is stiff in one direction perpendicular to the longitudinal axis, but limber in the other direction. Thus if the device experiences a severe steady side acceleration it will deflect, though its frequency will not change so long as the small angle assumption is not violated. This problem may be counteracted by providing some integration in the electrical feed back system so that a steady bias is developed to counteract such side acceleration. Where sidewise vibration is severe near the natural frequency of the reed, some vibration isolation might be necessary. Usually the gimbal mounting ring necessary in an inertial navigation system will supply adequate vibration isolation. Also, most systems have a single direction along which the most severe accelerations are experienced so that accelerometers can be mounted with their limber axis normal to this axis.

Figs. 2a and 2b show plan and elevation views of an embodiment of the invention. Since both halves of the accelerometer are identical only one is shown completely. The base 1 mounts the identical reeds 2 and 2' at its center, the reeds extending in opposite directions along the axis 3. The reeds, which are preferably made of special low temperature coefficient spring material, are reduced at 4 and 4' to provide the required spring restraint transversely of the base with rigidity in a direction normal to the base. A mass 5 of magnetic material such as high silicon steel serves both as the principal mass of the reed and also as the armatures of electric force motors having coils 6 and 7. The reed 2 also mounts a small permanent magnet 8 which sweeps past a core 9 mounted on the base and carrying pickup coil 10.

The electrical circuit of the accelerometer is shown in Fig. 3. Pickup coil 10, which is divided into two equal parts electrically connected as shown in Fig. 3, has induced in it by moving magnet 8 a voltage of the same frequency as the vibrating frequency $W_1$ of reed 2. After amplification by amplifier 11, this voltage is applied to coils 6 and 7 through rectifiers 12 and 13 and also to mixer 14. Diodes 12 and 13 act as switching devices for coils 6 and 7 causing these coils to be energized at the proper places in the vibration cycle of reed 2 to sustain its oscillation, this energy for this purpose being derived from source 15. If necessary, the maximum amplitude of reed 2 may be limited by biased diodes 16 which limit the maximum voltage that may be applied to diodes 12 and 13.

It will be understood that an identical electrical circuit is provided to sustain the oscillation of reed 2' and to supply a voltage of the frequency $W_2$ of reed 2' to mixer 14. The intermodulation of the frequencies $W_1$ and $W_2$ that occurs in mixer 14 produces the sum and difference frequencies $W_1+W_2$ and $W_1-W_2$ which, after separation by filters 17 and 18, are applied to counters 19 and 20, respectively. The counters convert these frequencies into proportional digital numbers which are then multiplied in digital multiplier 21 to produce the acceleration as a digital number in accordance with Equation 9. The interval over which this computation takes place is determined by the length of the gate voltage produced by generator 22 which opens gate 23 admitting the output frequencies of the mixer to the counters 17 and 18. The generation of the gate voltage is controlled by a trigger pulse which is also applied as a reset pulse to the two counters. The pulse is delayed before application to the gate voltage generator in order to allow resetting of the counters to be completed before a new computing period is initiated.

I claim:

An accelerometer comprising two identical reeds attached to a common support and extending in opposite directions from said support, means for producing sustained vibration of said reeds at their natural frequencies, said frequencies being functions of the magnitude and sign of the acceleration of the reeds along their longitudinal axis, means forming part of said vibration producing means for generating voltage waves having frequencies proportional to the natural frequencies of said reeds, means receiving said voltage waves as inputs and producing therefrom a voltage wave having a frequency equal to the sum of the frequencies of said inputs and a voltage wave having a frequency equal to the difference of the frequencies of said inputs, counting means receiving said sum frequency and said differency frequency waves as inputs for converting said sum frequency and said differency frequency into proportional digital numbers, and means for multiplying said digital numbers to form a digital product proportional to the magnitude of the acceleration of said reeds along their longitudinal axis.

No references cited.